Feb. 26, 1952     M. R. SHEEN     2,587,395

STROKE CONTROL MECHANISM

Filed May 8, 1950     7 Sheets-Sheet 1

INVENTOR.
MILTON ROY SHEEN, DECEASED,
BY EMMA ELIZABETH SHEEN, EXECUTRIX.

ATTORNEYS.

Fig. 4.

Inventor:
MILTON ROY SHEEN, DECEASED,
BY EMMA ELIZABETH SHEEN, EXECUTRIX.
Attorneys.

INVENTOR
MILTON ROY SHEEN, DECEASED,
BY EMMA ELIZABETH SHEEN, EXECUTRIX
BY
ATTORNEYS.

Patented Feb. 26, 1952

2,587,395

UNITED STATES PATENT OFFICE 2,587,395

STROKE CONTROL MECHANISM

Milton Roy Sheen, deceased, late of Glenside, Pa., by Emma Elizabeth Sheen, executrix, Glenside, Pa., and Isaac A. Pennypacker, executor Application May 8, 1950, Serial No. 160,680

7 Claims. (Cl. 103—38)

This invention relates to stroke control mechanism for pumps and the like.

The present application is a continuation-in-part of application Serial No. 654,180, for Stroke Control Mechanism, filed March 13, 1946, now abandoned.

A purpose of this invention is to provide a stroke control for a pump in which a given movement of the stroke control adjustment will provide a lineal and preferably equal change in stroke.

A further purpose in a pump mechanism is to provide an adjustment head pivoted and swingable toward and away from a pump cylinder, with link means interconnecting a pump piston and an ajustment pivot carried by the adjustment head, and means for moving the adjustment pivot toward and away from the adjustment head pivot under the action of a motor drive.

A further purpose is to provide an adjustment head pivoted and swingable toward and away from a reciprocating pump, having an adjustable pivot on the adjustment head, and with an adjustment operatively connected to the adjustable pivot through the pivot of the adjustable head, with a link pivotally connecting the adjustable pivot and the pump and a drive for the adjustment head swinging the adjustment head back and forth between limiting positions, the adjustable pivoting in all adjustment positions lying in a line perpendicular to the pump axis through the pivot of the adjustment head in the mid-position of the throw of the adjustment head.

A further purpose is to interconnect a link from an adjustment head with a crosshead driving the pump piston, and to adjust the pivot of the link on the adjustment head toward and away from the fixed pivot of the adjustment head by a motor drive.

A further purpose is to provide on the adjustment head a motor driven screw adjustment which controls, with respect to the adjustment head pivot, the position of the pivotal connection of a link driving the pump from the adjustment head movement.

A further purpose is to drive the adjustment head by a shaft on the axis of the pivot of the adjustment head, preferably interconnecting the shaft with an adjustment screw by gearing.

A further purpose is to provide a swinging adjustment head on a fixed pivot and drive a pump by a link making adjustable pivotal connection with the adjustment head, dimensioning the parts so that a given movement of the adjustment pivot produces an identical change in a pump stroke.

A further purpose is to provide an indicator on the adjustment head showing the position at any time of the adjustment pivot.

Further purposes appear in the specification and in the claims.

In the drawings it was chosen to illustrate one only of the numerous embodiments of the invention, with a variation, the form and variation being chosen from the standpoints of convenience in operation, satisfactory construction and clear demonstration of the principles involved.

Figure 1 is a top plan view of the pump and stroke control mechanism.

Figure 1ª is a fragmentary variation of Figure 1 showing a hand adjustment for the stroke control.

Figure 5 is an enlarged fragmentary section of Figure 4 on the line 5—5.

Figure 5ª is an isolated perspective view of certain gearing seen in Figure 5.

Figure 6 is a section on the line 6—6 of Figure 5.

In the drawings like numerals refer to like parts.

In the prior art difficulty has been encountered in stroke controls for pumps either because it was not possible to make continuous change in stroke without interrupting the pump operation, thus making impossible automatic operation of the stroke control, or because it was not possible to obtain a direct linear relationship and preferably a relationship of equality between the movement of the adjustment and the change in stroke. Where in such prior art devices it was necessary to introduce complicated proportioning mechanism between a metering device and a stroke control, or where, as was frequently the case, a change in adjustment over one part of the adjustment range produced a different change in stroke from that caused by the same change in adjustment over another portion of the adjustment range, the complications involved in automatic operation of the stroke control device were very serious.

It was discovered that it is not only possible to produce a stroke control which can be operated with complete accuracy without interrupting the operation of the pump, but that it is also possible to make the relation between the change in the stroke control adjustment and the change in stroke linear over all ranges of adjustment, but actually to obtain an equality between the change in adjustment and the change in stroke of the pump.

Figure 2:
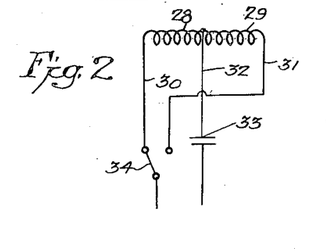
Figure 2 is a diagrammatic view of an electric motor circuit.
Figure 3:
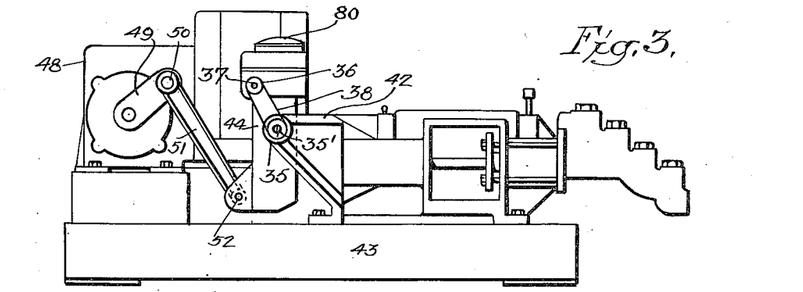
Figure 3 is a section on the line 3—3 of Figure 1, showing the base in elevation.
Figure 4:
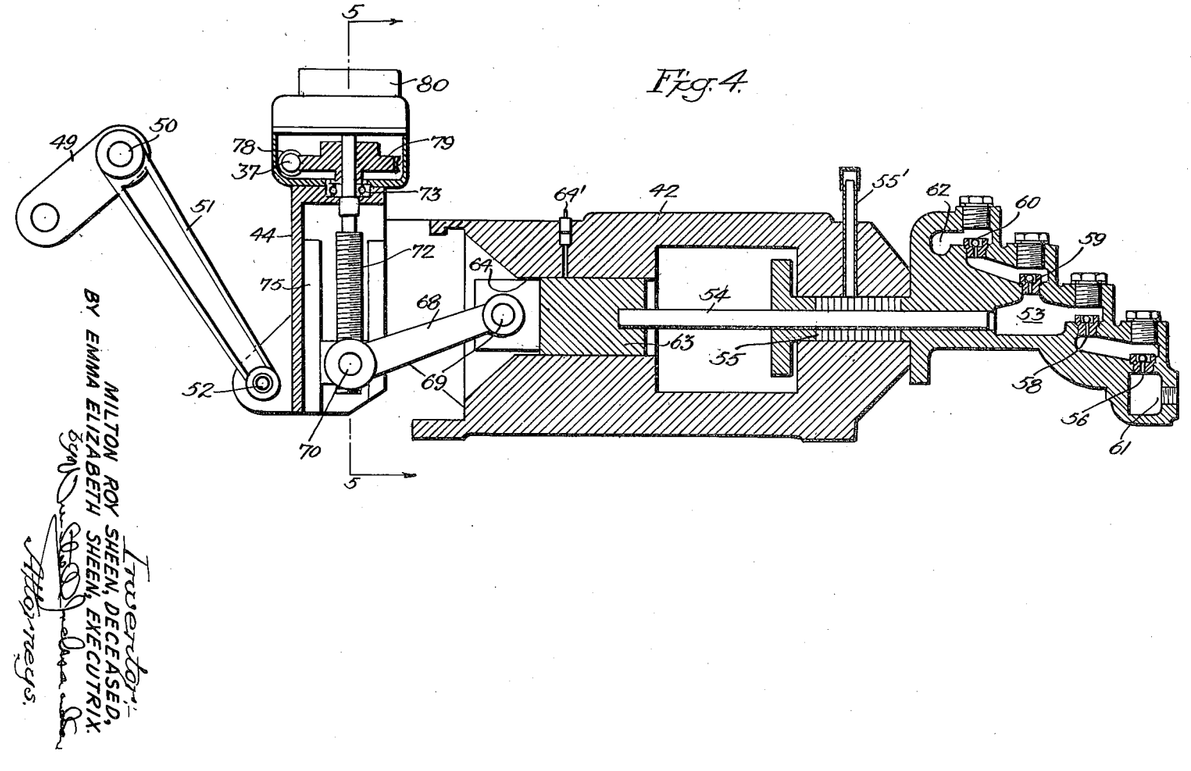
Figure 4 is an enlarged fragmentary section of Figure 1 on the line 4—4.

The controlling signal may be transmitted to the mechanism in any suitable way from any suitable metering device or the like which will determine the desired output of the pump at any moment. In the drawings there is indicated diagrammatically a suitably remote metering mechanism 25 connected to a device 26, suitably a selsyn system or self-balancing potentiometer, operated by a suitable electric power source, by which the electric driving motor 27 for the stroke control adjustment is turned on and off and reversed. A suitable type of motor winding is shown having coils 28 and 29 connected by end leads 30 and 31 to the source through suitable control mechanism, with a central lead 32 having a capacitor 33, and a discriminating switch 34 on the control mechanism which determines when the motor will start or stop and which section of the winding is to be actuated and therefore in which direction the motor is to run on starting. It will be understood that this disclosure is intended to be diagrammatic merely.

The drive from the stroke control adjustment motor is through any suitable speed reduction to a sprocket 35, which is on an adjustment shaft 35' having the same axis as the adjustment head later to be described. The sprocket 35 connects with a sprocket 36 on a worm shaft 37 by a chain 38.

Figures 1, 1A:
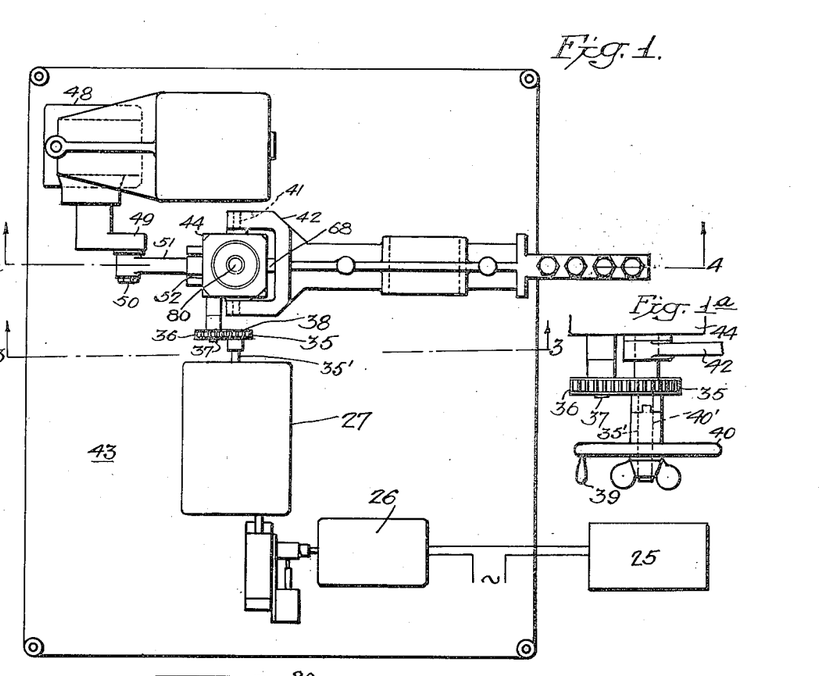

If desired, the adjustment shaft 35' may be hand set as shown by the handle 39 and crank 40 (Figure 1a), turning loosely on an extension 40' of a fixed pivot later described. The crank turns the sprocket 35 above described.

The adjustment shaft 35' is in line with a fixed pivot 41 on the frame 42 supported on base 43 and about which an adjustment head 44 swings. The adjustment head is driven in its swinging path by a preferably continuously operating electric motor 48 driving a crank 49 which makes pivotal connection at 50 to a driving link 51 which is pivotally connected to the adjustment head 44 at 52.

Under the action of this drive, the adjustment head swings back and forth desirably in an invariable path. The linear relation between the adjustment and the change of stroke, and the condition of equality, later described, can very conveniently be obtained by regulating the arc through which the adjustment head swings to 60° with as much precision as is necessary, and the arc of swing should then be equal on either side of a line through the fixed pivot 41 of the adjustment head perpendicular to the axis of the pump cylinder, later to be described.

The pump itself may be of any suitable type, and the intention in showing the particular pump embodiment is not to limit to this particular form, but merely to indicate a desirable form. The pump essentially comprises a cylinder 53 having a reciprocating pump piston 54 passing through packing 55, provided with a vent at 55'. In this particular form of pump, there are desirably used multiple inlet check valves 56 and 58, and multiple outlet check valves 59 and 60 respectively in an inlet passage 61 and an outlet passage 62, suitably connected respectively to a source of fluid being pumped and to an outlet distribution line, not shown.

The piston is desirably supported, moved and guided by a crosshead 63 in crosshead guides 64, lubricated at 64', the crosshead being either a part of or adjunct to the piston as preferred.

This pump is shown in Milton Roy Sheen U. S. Patent No. 2,367,893.

The piston is driven by the adjustment head through the interconnection of a link 68 making pivotal connection to the crosshead 63 at 69 and connecting with the adjustment head at an adjustment pivot point 70. The adjustment pivot point 70 moves along an adjustment path 71 toward and away from the fixed pivot 35' of the adjustment head in order to control the stroke. This motion is preferably accomplished by an adjustment screw 72 having bearing support at 73 in the adjustment head and threading into a nut 74 which supports the adjustment pivot and is guided slidably in ways 75.

It is very convenient in obtaining the equalized 60° swing of the adjustment head, to make the arm of the driving crank 49 equal the perpendicular distance of the pivot point 52 of the driving link 51 on the adjustment box to the axis of the adjustment screw 72.

As the adjustment head swings, the worm shaft 37 swings back and forth with it, but the sprocket 36 on this shaft maintains its connection with the sprocket 35 on the fixed pivot axis by means of the chain 38.

The interconnection between the worm shaft 37 in the adjustment head and the adjustment screw 72 may be accomplished by any suitable gearing, here shown as a worm 78 on the worm shaft and a worm wheel 79 on the adjustment screw.

Figures 5, 5A, 6:
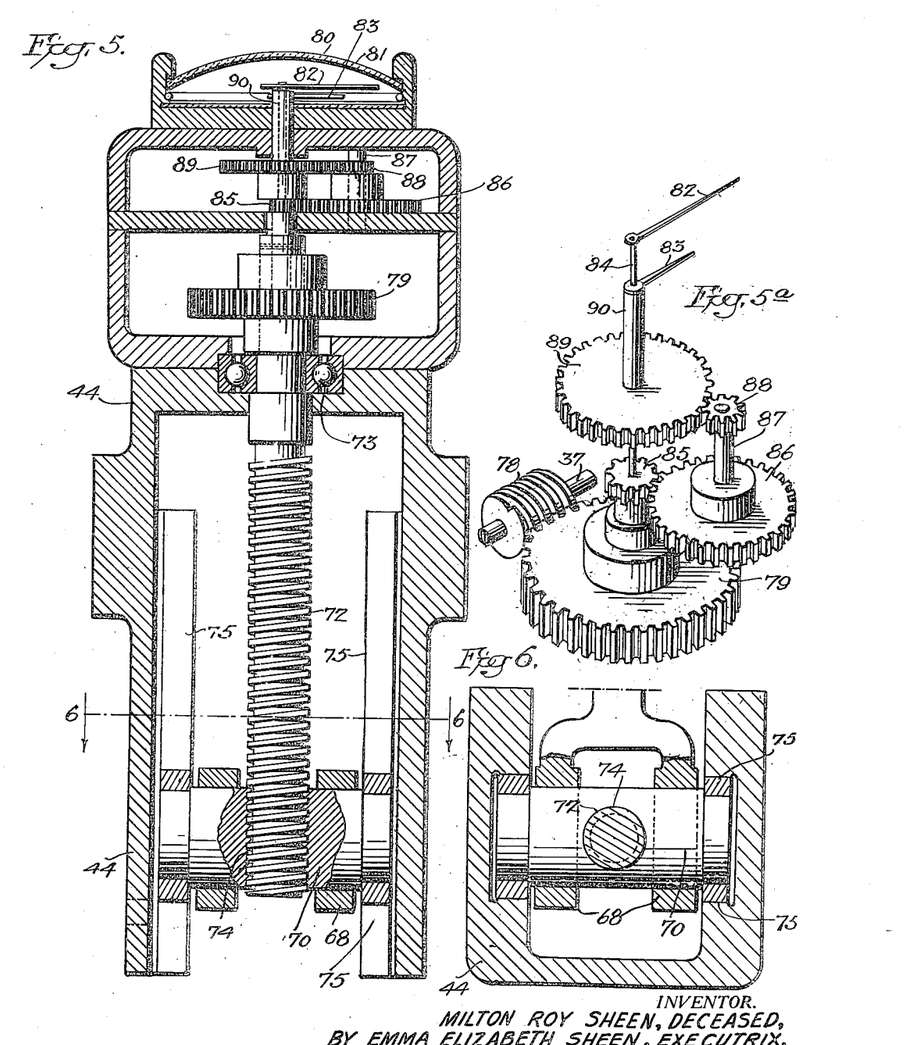

It is important to be able to ascertain at any time the position of the adjustment pivot point. With this object in view, an indicator 80 is provided at the top of the adjustment head, with a cover glass 81, showing a fast moving hand 82 and a slow moving hand 83. The gearing for driving these hands desirably consists of a shaft 84 directly driving the fast hand from the adjustment screw 72 and reduction gearing driving the slow hand consisting of a pinion 85 on shaft 84, driving a spur gear 86 on shaft 87 which drives a pinion 88 on the same shaft, meshing with a spur gear 89 on sleeve shaft 90 surrounding the shaft 84 and carrying the slow hand 83. Bearings for the shafts are provided as shown in Figure 5.

Figure 7:
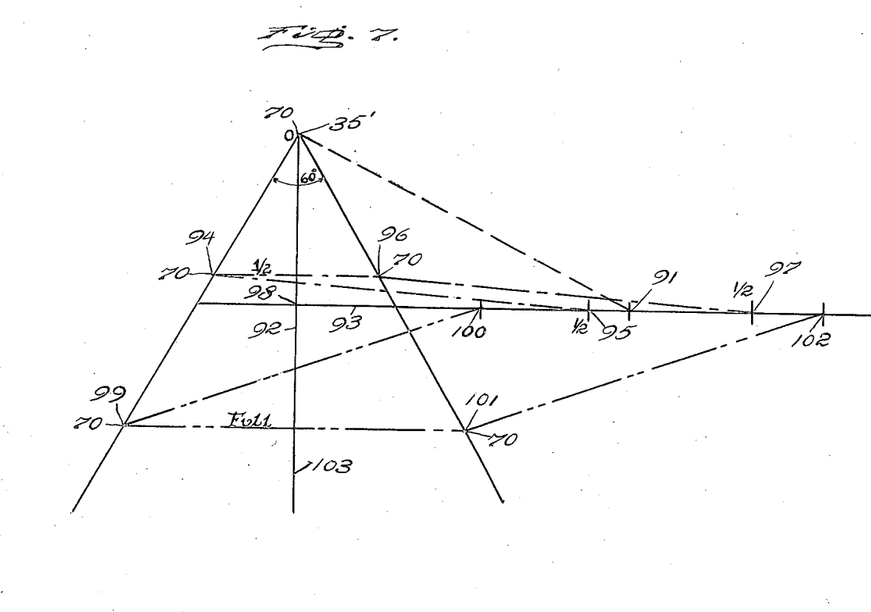
Figure 7 is a diagrammatic position layout showing that the adjustable pivot in mid-position is on a line perpendicular to the pump axis for all adjustment positions.
Figure 8:
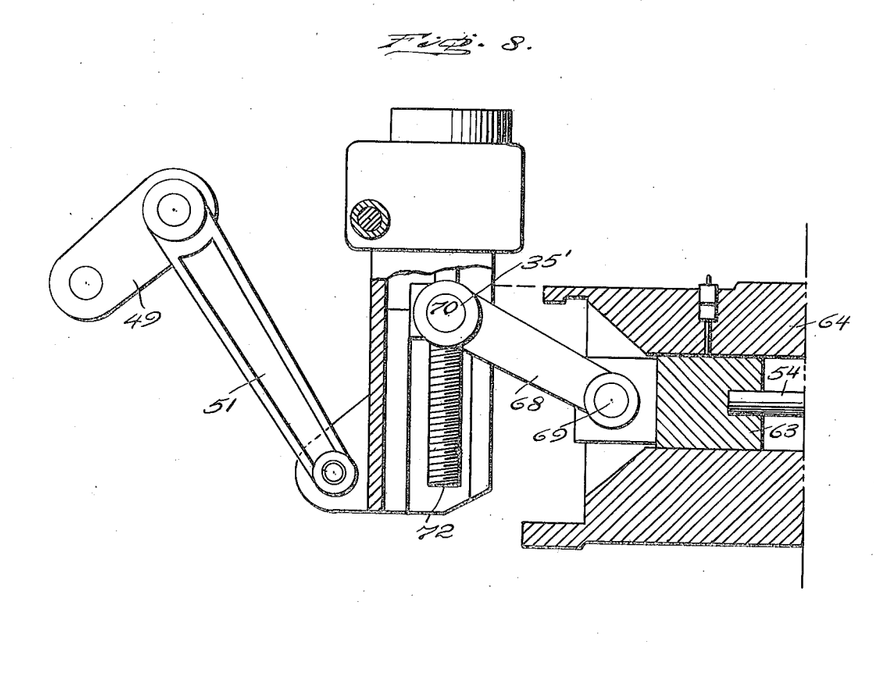
Figures 8 to 12 inclusive are diagrammatic fragmentary enlargements showing the positions of the operating parts for the different adjustment positions and limiting positions of the adjustment head which are consolidated on Figure 7.

Figure 8 shows an adjustment for zero stroke at which the adjustable pivot 70 coincides with the pivot of the adjustment head 35'. This is shown at the extreme top of Figure 7, the link 68 holding the pivotal connection 69 of the cross head at point 91 (Figure 7) for all positions of the adjustment head. It will be noted that in mid-position of the adjustment head the line 92, perpendicular to the axis 93 of the piston and pump cylinder, passes through the point 35', 70 for zero adjustment.

Figure 9:
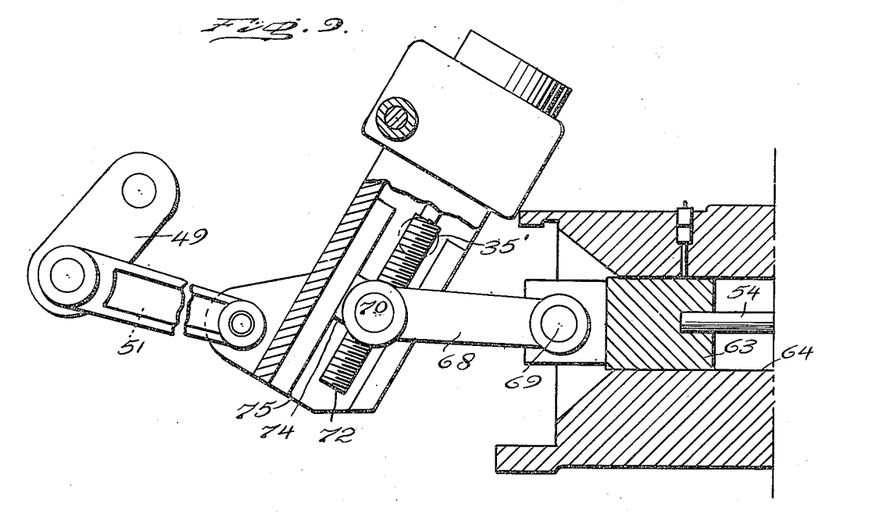
Figure 10:
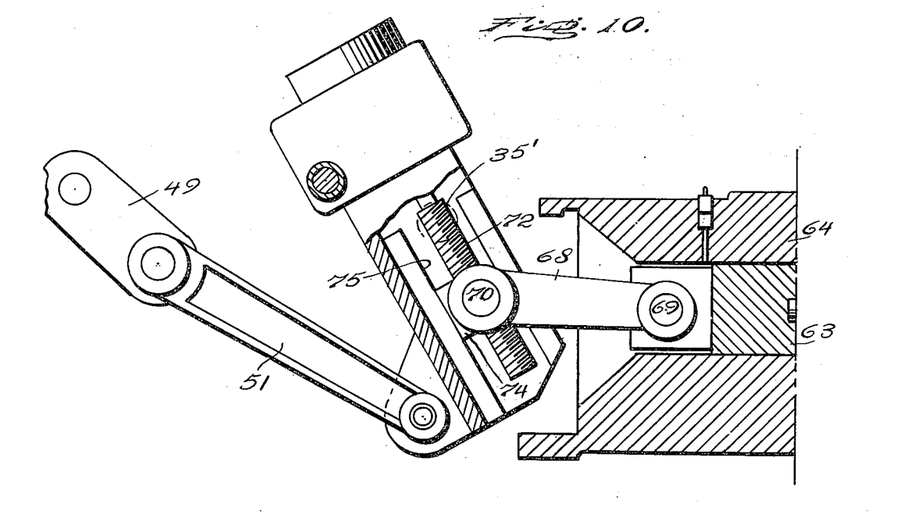

As the adjustable pivot 70 moves farther from the fixed pivot 35' of the adjustment head, a position of halfway adjustment is reached corresponding to Figure 9 for the beginning of the stroke and Figure 10 for the end of the stroke. The adjustable pivot position 70 for Figure 9 is shown at 94 in Figure 7 corresponding with Figure 9 and producing a position 95 for pivot connection 69 of link 68. Likewise the adjustment pivot at the end of the stroke reaches a point 96 in Figure 7 and the pivotal connection 69 reaches a point 97 corresponding to the limit of the stroke in Figure 10. It will be noted that the adjustable pivot in mid-position lies at 98 again along line 92 perpendicular to axis 93 of the piston.

Figure 11:
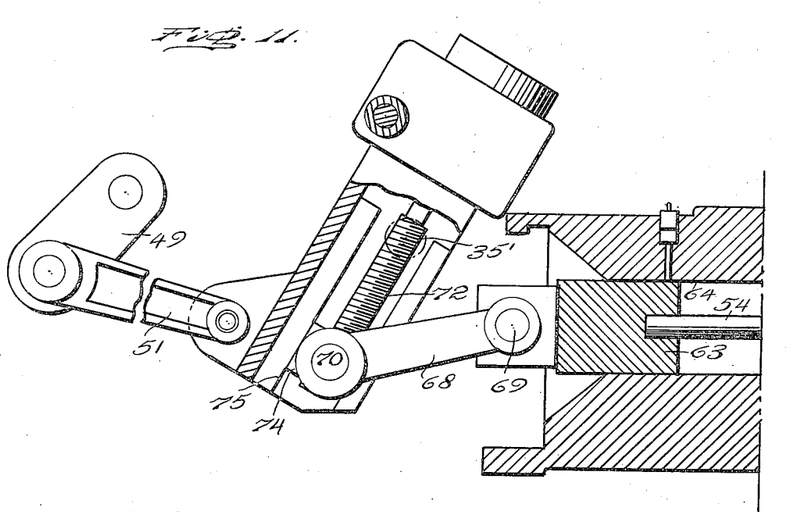
Figure 12:
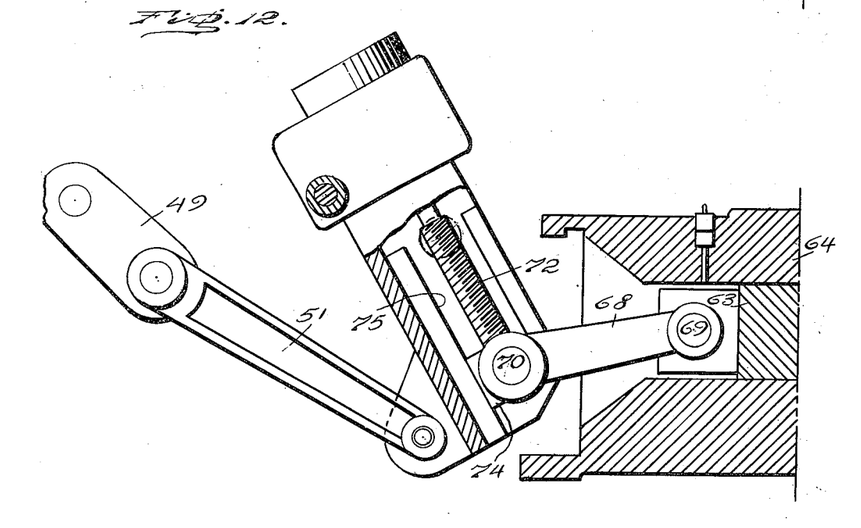

The full stroke adjustment position is shown in Figures 11 and 12 and the lower portion of Figure 7, Figure 11 showing the beginning of the stroke and Figure 12 the end of the stroke. The adjustable pivot 70 at full stroke position in Figure 11 at the beginning of the stroke corresponds with point 99 in Figure 7, moving the pivotal connection 69 of link 68 to point 100. Similarly the position for full stroke at the end of the stroke as shown in Figure 12 brings adjustment pivot 70 to point 101 and pivotal connection 69 of link 68 to point 102. Here again on the middle of the stroke the adjustment pivot 70 is at point 103, which is on line 92 perpendicular to the axis of the pump piston and cylinder and extending through the fixed pivot 35' of the adjustment pivot.

It will be noted that the stroke is shortened by an amount exactly equal to the difference between the adjustment pivot positions in the respective views, so that a linear and preferably equal relationship exists between the change of adjustment and the change of stroke.

It will be evident that the line perpendicular to the pump axis through the pivot of the adjustment head in the mid-position of the adjustment head includes the adjustment pivot in any adjustment position. The throw of the adjustment head must be equal on either side of this perpendicular line.

It is believed that the inventor was the first to obtain a truly linear relation over the full range of adjustment in an automatic stroke control of a pump and it is also believed that the inventor was the first to obtain a relation of equality between the adjustment and the change in stroke.

It is also believed that the inventor was the first to provide the simple and convenient drive of an adjustment head from a motor by an adjustment shaft on the axis of the fixed pivot which interconnects to an adjustment screw or the like for changing the relation of the adjustment pivot point to the fixed pivot.

In view of this invention and disclosure variations and modifications to meet individual whim or particular need will doubtless become evident to others skilled in the art, to obtain all or part of the benefits of this invention without copying the structure shown, and, therefore, all such are claimed insofar as they fall within the reasonable spirit and scope of the claims.

Having thus described the invention what is claimed as new and desire to secure by Letters Patent is:

1. In a pump mechanism, a plunger reciprocable on a plunger axis, in combination with an adjustment head pivoted about a first pivot and swingable toward and away from the plunger, a second and adjustable pivot on the adjustment head, an adjustment operatively connected to the second and adjustable pivot through the first pivot of the adjustment head, a link pivotally connecting the second and adjustable pivot and the plunger and a drive for the adjustment head swinging the same back and forth between limiting positions, the line perpendicular to the plunger axis through the first pivot of the adjustment head in mid-position of the throw of the adjustment head including the second and adjustable pivot at any adjustment position.

2. In a pump mechanism, a plunger reciprocable on a plunger axis, in combination with an adjustment head pivoted about a first pivot and swingable toward and away from the plunger, a second and adjustable pivot on the adjustment head, an adjustment operatively connected to the second and adjustable pivot through the first pivot of the adjustment head, a link pivotally connecting the second and adjustable pivot and the plunger and a drive for the adjustment head swinging the same back and forth between limiting positions over an angle of 60°, the line perpendicular to the plunger axis through the first pivot of the adjustment head in mid position of the throw of the adjustment head including the second and adjustable pivot at any adjustment position.

3. In a pump mechanism, a plunger reciprocable on a plunger axis, in combination with an adjustment head pivoted about a first pivot swingable toward and away from the plunger, guides on the adjustment head, a second and adjustable pivot in the guides, a screw making threaded interconnection with the second and adjustable pivot and extending longitudinally of the guides, mounted on and swinging with the adjustment head, a link pivotally connecting the second and adjustable pivot and the plunger and a drive for the adjustment head swinging the same back and forth between limiting positions, the line perpendicular to the plunger axis through the first pivot of the adjustment head in mid-position of the throw of the adjustment head including the second and adjustable pivot at any adjustment position.

4. In a pump mechanism, a plunger reciprocable on a plunger axis, in combination with an adjustment head pivoted about a first pivot swingable toward and away from the plunger, guides on the adjustment head, a second and adjustable pivot in the guides, a screw making threaded interconnection with the adjustable pivot and extending longitudinally of the guides, mounted on and swinging with the adjustment head, a link pivotally connecting the second and adjustable pivot and the plunger a drive for the adjustment head swinging the same back and forth between limiting positions through an angle of 60°, the line perpendicular to the plunger axis through the first pivot of the adjustment head in mid position of the throw of the adjustment head including the second and adjustable pivot at any adjustment position.

5. In a pump mechanism, a plunger reciprocable on a plunger axis, in combination with an adjustment head pivoted about a first pivot and swingable toward and away from the plunger, guides on the adjustment head, a second and adjustable pivot in the guides, an adjustment screw extending longitudinally of the guides in the adjustment head and making threaded interconnection with the second and adjustable pivot, an adjustment shaft on the axis of the first pivot of the adjustment head, gearing interconnecting the adjustment shaft and the screw, a link pivotally connecting the second and adjustable pivot and the plunger and a drive for the adjustment head swinging the same back and forth between limiting positions, the line perpendicular to the plunger axis through the first pivot of the adjustment head in mid-position of the throw of the adjustment head including the second and adjustable pivot at any adjustment position.

6. In a pump mechanism, a plunger reciprocable on a plunger axis, in combination with an adjustment head pivoted about a first pivot and swingable toward and away from the plunger, guides on the adjustment head, a second and adjustable pivot in the guides, an adjustment screw extending longitudinally of the guides in the adjustment head and making threaded interconnection with the second and adjustable pivot, an adjustment shaft on the axis of the first pivot of the adjustment head, gearing interconnecting the adjustment shaft and the screw, a link pivotally connecting the second and adjustable pivot and the plunger and a drive for the adjustment head swinging the same back and forth between limiting positions through an angle of 60°, the line perpendicular to the plunger axis through the first pivot of the adjustment head in mid-position of the throw of the adjustment head including the second and adjustable pivot at any adjustment position.

7. In a pump mechanism, a plunger reciprocable on a plunger axis in combination with an adjustment head pivoted about a first pivot swingable toward and away from the plunger, guides on the adjustment head, a second and adjustable pivot in the guides, a screw in the adjustment head extending longitudinally of the guides and making threaded interconnection with the second and adjustable pivot, an indicator on the adjustment head, gearing interconnecting the indicator with the screw, a link pivotally connecting the second and adjustable pivot and the plunger and a drive for the adjustment head swinging the same back and forth between limiting positions, the line perpendicular to the plunger axis through the first pivot of the adjustment head in mid-position of the throw of the adjustment head including the second and adjustable pivot at any adjustment position.

EMMA ELIZABETH SHEEN.

*Executrix of the Estate of Milton Roy Sheen, Deceased.*

REFERENCES CITED

The following references are of record in the file of this patent:

UNITED STATES PATENTS

| Number | Name | Date |
| --- | --- | --- |
| 2,031,609 | Logue | Feb. 25, 1936 |
| 2,191,552 | Zimmermann | Feb. 27, 1940 |
| 2,235,631 | Frenkel | Mar. 18, 1941 |
| 2,240,371 | Linch et al. | Apr. 29, 1941 |
| 2,259,587 | Rush | Oct. 21, 1941 |
| 2,323,950 | Wade | July 13, 1943 |
| 2,367,893 | Sheen | Jan. 23, 1945 |
| 2,370,710 | Blair | Mar. 6, 1945 |

FOREIGN PATENTS

| Number | Country | Date |
| --- | --- | --- |
| 661,717 | Germany | 1938 |